Aug. 5, 1969 R. W. GARDNER 3,460,135

PULSED SYMBOL MASK SHIFTING ARRANGEMENT

Filed Sept. 7, 1966 2 Sheets-Sheet 1

INVENTOR.
RAYMOND W. GARDNER
BY
Fraser and Bogucki
ATTORNEYS

INVENTOR.
RAYMOND W. GARDNER
BY Fraser and Bogucki
ATTORNEYS

3,460,135
PULSED SYMBOL MASK SHIFTING ARRANGEMENT

Raymond W. Gardner, Lakewood, Calif., assignor to Shelly Associates, Inc., a corporation of California Filed Sept. 7, 1966, Ser. No. 577,678
Int. Cl. G08b 5/22
U.S. Cl. 340—378 11 Claims

ABSTRACT OF THE DISCLOSURE

This invention relates to an optical projection device in which various symbols are arranged on a symbol mask and the particular symbol to be projected is aligned with the projection path. The symbol mask and an associated shuttle arrangement are pulse operated such that the particular symbol on the mask which is to be projected is held in alignment with the projection path by the shuttle element.

This invention relates to multiple message unit readout devices, and more particularly to visual readout devices of the type wherein any one or more of a large number of characters is projected for visual display on a common viewing area.

Visual readout devices are presently being widely used in computers, data processing equipment, automatic controls and military applications for displaying information in a readily usable form to the operators. Such devices are available in a number of different forms to display numbers, letters, color codes and word messages. However, presently available readout device of this type are capable of displaying only a very limited number of message units. Therefore, where the number of selectable message units for a given application exceeds the rather limited message capacity of a single readout device, additional readout devices must be employed to provide the needed message capacity. Such an expedient, however, greatly increases the amount of space necessary for message display units and reduces their versatility so that certain types of displays, such as those in which individual letters or numbers are displayed on each of a number of adjacent devices to form complete messages, become impracticable. Also, the multiplication of component parts required for large numbers of display devices multiplies the complexity, cost and maintenance problems of the display.

One of the available types of optical readout devices employs a plurality of optical projection paths each having a light source and a lens system for projecting a magnified image of a selected message symbol or color code onto a common viewing surface. The symbols or color codes to be projected are arranged on a single symbol mask in alignment with the projected path of an associated one of the optical systems. The selection of message symbols may be increased, as hereinafter disclosed in accordance with the invention, by providing a plurality of message symbols for each optical path arranged on the symbol mask so that a selected set of message symbols is aligned in the projection paths by precisely positioning the symbol mask. However, the method used to achieve precise positioning of the symbol mask should be relatively simple and inexpensive so that the advantages resulting from the greater selection of message symbols are not offset by the complexity and cost of the symbol mask shifting arrangement. Also, the symbol mask shifting arrangement should operate with minimum power requirement to maintain the precise position of the symbol mask once selected without requiring a continuous application of power.

Accordingly, it is an object of the present invention to provide an improved multiple message unit readout device with a substantially greater number of selectable message symbols.

It is an object of the present invention to provide an optical projection readout device capable of selectively displaying a relatively large number of characters or symbols using a minimum number of component parts.

It is a further object of the present invention to provide an improved shifting arrangement for precisely positioning a movable symbol mask relative to one or a plurality of optical paths.

These and other objects are accomplished in accordance with the present invention by providing an image projection type readout device having a unique pulse operated movable symbol mask and shuttle arrangement wherein each projection path is capable of projecting a selected one of a plurality of different message symbols disposed on a movable symbol mask onto a common viewing area. The message symbols are arranged on the symbol mask in different sets which can be aligned with respect to the projection paths to position a selected symbol in each projection path for projection onto the common viewing area.

In accordance with a particular aspect of the invention, the plurality of message symbols for each optical path are spaced from one another along axes in a direction of symbol mask movement so that the selected set of message symbols is aligned with the projection paths by shifting the symbol mask a precise distance equal to the spacing between the symbols along the axes. The symbol mask is urged to a normal position with one edge abutting a base member to align a first set of symbols with the different projection paths. To align one of the other sets with the projection paths, the symbol mask is moved away from the base member and a selected spacer element or shuttle inserted between the base member and the symbol mask. Each shuttle has a portion with a different thickness that corresponds to the spacing between the message symbols of the first set and those of another set.

In particular, an energizing pulse applied to a solenoid, or other similar motive means, attached to the symbol mask moves it away from the base member to permit insertion of one of the shuttles, each of which is coupled to an associated spring-loaded solenoid. As the edge of the symbol mask is moved away from the base member by actuation of the symbol mask solenoid, an energizing pulse may be applied to one of the shuttle solenoids to move the selected shuttle against the spring force into the plane of the symbol mask. As the energizing pulse to the symbol mask solenoid ceases, the symbol mask is turned towards the base member to engage the inserted shuttle. Subsequently, after termination of the energizing pulse to the shuttle solenoid, the spring force tends to move the shuttle back towards its original position. However, each shuttle is provided with a protruding lip or detent at its end which engages the lower edge of the symbol mask to prevent complete withdrawal of the shuttle. Thus, the symbol mask is held in position with its edge against the shuttle so that a selected set of symbols is maintained precisely aligned with the optical paths until the occurrence of the next energizing pulse, at which time the symbol mask again moves away from the base member to disengage its lower edge from the protruding lip or detent, thus allowing the shuttle to be withdrawn by the spring force.

A simple mechanical delay coupling between the shuttle solenoids and their respective shuttles may be employed to permit simultaneous application of energizing pulses both to the symbol mask solenoid and the selected one of the shuttle solenoids. In this way, the shuttle is prevented from moving into the plane of the symbol mask until the symbol mask has moved away from the base member a sufficient distance to allow the shuttle insertion, and the symbol mask is returned towards its normal position to engage the shuttle before it can be withdrawn by the spring force.

These and other aspects of this invention may best be understood from the following detailed description, taken in conjunction with the accompanying drawings, in which.

Figure 3:
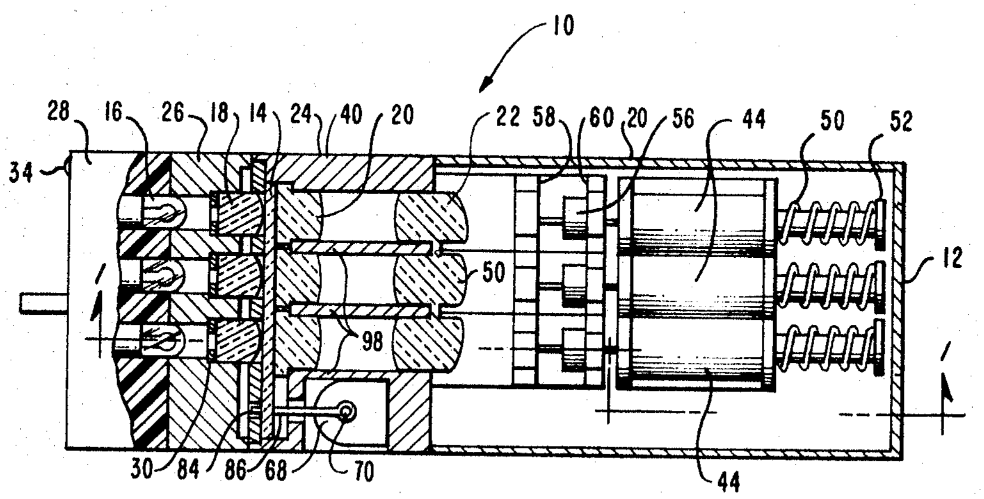
FIG. 3 is a top sectional view of the readout device of FIGS. 1 and 2 taken along the line 3—3 of FIG. 2.
Figure 1:
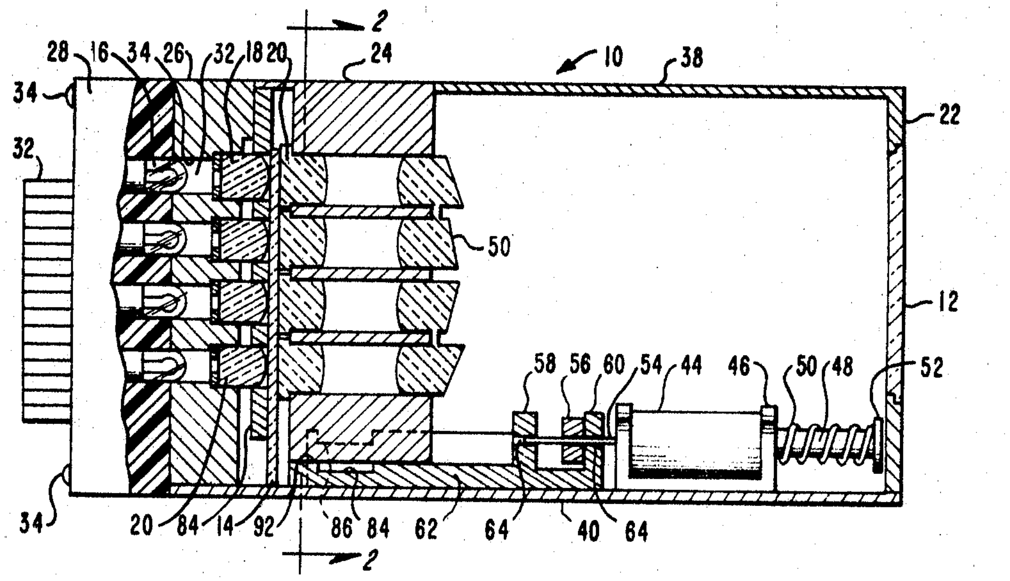
FIG. 1 is a side sectional view of a preferred embodiment of a multiple message unit readout device in accordance with the present invention.

Referring now to the drawings, in which like elements illustrated in the different figures are indicated by the same reference numerals, a preferred embodiment of a multiple message unit readout device 10 in accordance with the invention has a plurality of individually operable image projection systems for projecting selected images onto a viewing screen 12. Different message symbols are provided on a symbol mask 14 to be disposed in the optical paths of the projection systems for selective display on the viewing screen 12. In the preferred embodiment illustrated herein, the projection systems are of the type described in detail in the copending patent application Ser. No. 129,880, now issued as Patent No. 3,286,585, and assigned to the same assignee as the present invention, filed Aug. 7, 1961, by Stuart N. McCullough and Garrison G. Hollowich and entitled "Rear Projection Symbol Presentation." However, the image projection systems of this invention may be of any suitable type which are selectively operable to project images of message symbols on a symbol mask onto a viewing screen.

Typically each image projection system shown herein contains an individually operable light source, such as a miniature lamp 16, the light from which is condensed by a condensing lens 18 to illuminate a single message symbol on the symbol mask 14. The symbols on the symbol mask are formed as transparent portions on an opaque background. The light passing through the transparent portion of the symbol mask thus forms a light image of the symbol which is projected through a field lens 20 which forms a real image on the entrance surface of a projection lens 22. With the particular type of projection systems shown herein, the projection paths are axially parallel from the light sources 16 to the projection lenses 22, which have prismatic exit surfaces for deflecting the magnified image to a desired position on the viewing screen. The viewing screen 12 typically consists of a translucent light diffusing material such as Lucite, ground glass, coated clear plastic or other suitable material so that the image projected onto one side may be viewed from the other side.

The optical elements of the projection systems are mounted in cylindrical apertures formed in a series of mounting blocks 24, 26 and 28. The field lenses 20 and the projection lenses 22 are mounted at opposite ends of the cylindrical apertures through the mounting block 24. The condensing, field and projection lenses 18, 20 and 22 are preferably molded in groups of three or more each with webbing extending between adjacent lenses. This insures insertion of the lenses to the proper depth and with the proper alignment in the block 24. The condensing lenses 18 are mounted within counterbored apertures in the block 26 with, if desired, a washer element 30 having a small circular opening at its center to act as an optical stop for confining the light from each of the lamps 16 to the center of the optical paths. The bulbs 16 are mounted in apertures in the block 28 which has external connector 32 consisting of alternate conductive and insulating sections, each bulb being connected to be energized when voltage is applied to a selected one of the conductive sections. The mounting blocks 24, 26 and 28 are held together with the apertures aligned to define the projection paths as by means of screws 34 which, for example, extend through apertures provided in the blocks 28 and 26 to engage threaded bores in the block 24.

The viewing screen 12 is mounted at one end of a hollow rectangular housing member 38 at a position remote from the projection lenses 22. An image emerging from the prismatic exit surface of a projection lens 22 is projected through the hollow interior of the housing member 38 to impinge on the inner surface of the viewing screen 12. One side, in this case the bottom side as viewed in the drawing, of the rectangular housing member 38 is longer than the adjacent vertical and top sides of the rectangular housing member 38, and extends along the underside of the mounting block 24 and 26, to which it may be attached as by means of screws (not shown). The ends of the shorter sides abut the adjacent surfaces of the block 24 to form a rectangular hollow enclosure between the projection lenses 22 and the viewing screen 12.

A number of conventional spring-loaded solenoids 44 are mounted by means of brackets 46 welded or otherwise attached to the upper surface of the base member 40. Each spring-loaded solenoid 44 has its cylindrical core 48 surrounded by a helical coil spring 50, the opposite ends of the spring being in contact with the bracket 46 and a flange 52 at the end of the core to urge the core 48 towards a fully withdrawn position. The other end of the solenoid core 48 is attached by means of an operating shaft 54 to a plunger element 56 that is disposed for reciprocal movement between two vertical extensions 58 and 60 at one end of a movable shuttle or spacer element 62, the portions of the shaft 54 extending from either side of the plunger 56 being freely movable within larger diameter apertures through the vertical extensions 58 and 60. Upon energization of the solenoid 44 by current flow through the solenoid coil, the core 48 is drawn into the interior of the coil overcoming the force of the spring 50 to move the plunger 56 to the left as viewed in the drawings until it contacts the vertical extension 58 on the shuttle or spacer element 62, which is slidably movable on the smooth top surface of the base member 40 toward the plane of the symbol mask 14.

In accordance with this invention, the symbol mask 14 is movable, in this case vertically, by the action of another conventional spring-loaded solenoid 68, or other suitable motive means, in a plane between the field lenses 20 and the condensing lenses 18 in a slot provided at the entrance end of the block element 24. The solenoid coil is held by a bracket 70 within a vertical indentation in the side of the block element 24. The symbol mask solenoid 68 is preferably of the same type as the shuttle solenoids 44 in which a helical spring 72 surrounding the cylindrical solenoid core bears against an end flange 74 to urge the core to a withdrawn position. A shaft 76 at the other end of the solenoid core is attached to a horizontal arm 78 which extends through a slot 80 to engage the symbol mask 14 near one edge for lifting. A washer member 84 with apertures for receiving the protruding convex exit surfaces of the condensing lenses 18 is held by its sides against recessed ledges in the block 24 between the abutting peripheral surfaces of the block 26 and the symbol mask 14 to provide a relatively smooth sliding surface adjacent the moving symbol mask 14.

Figures 2, 4, 5:
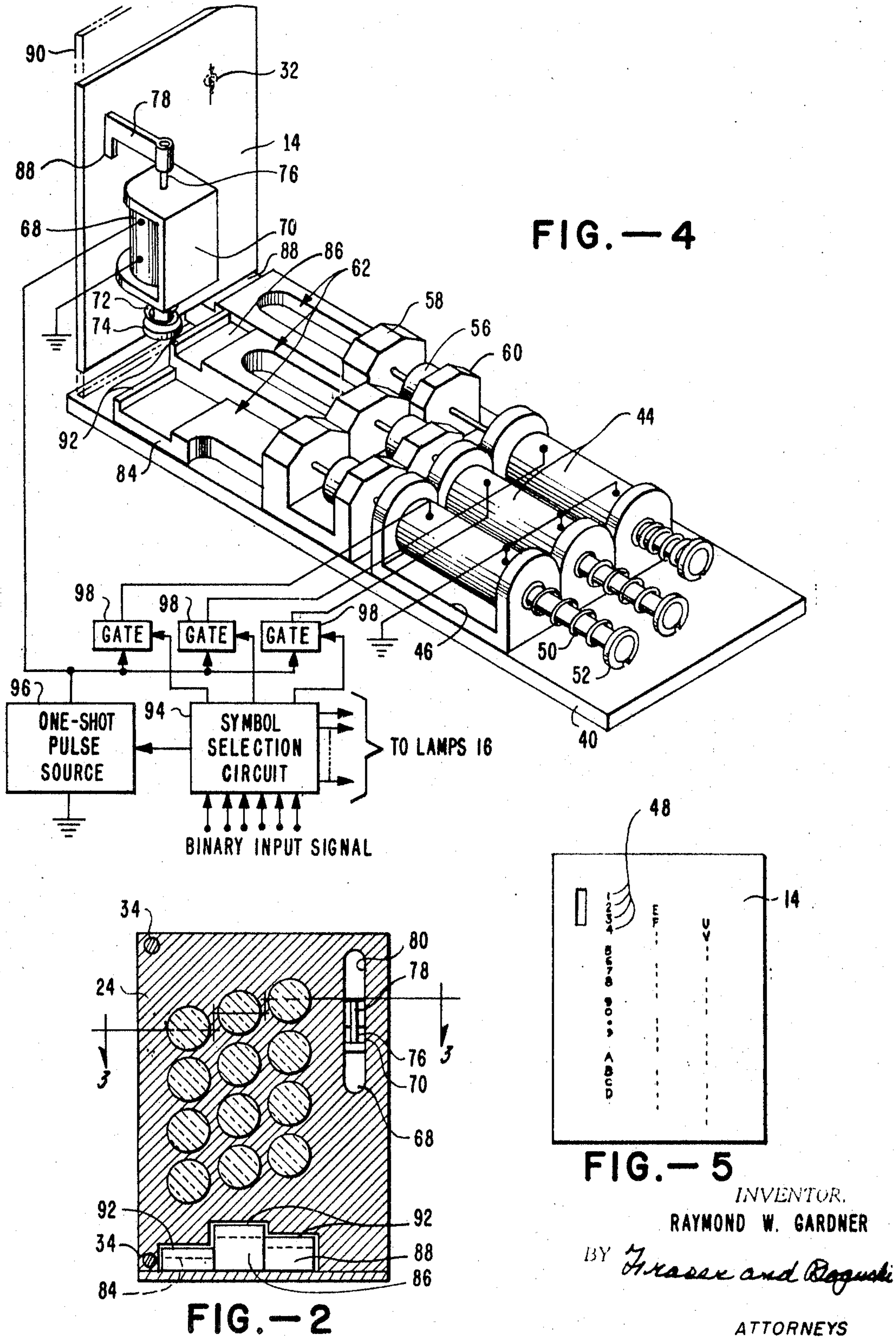
FIG. 2 is an end sectional view of the readout device of FIG. 1 taken along the line 2—2.
FIG. 4 is a perspective view of the operational portions of the readout device of the previous figures.
FIG. 5 is a plan view of the reticle used in the arrangement of FIGS. 1 through 4 illustrating schematically the arrangement of message units thereon.

The movable symbol mask 14 consists of a rectangular sheet of clear transparent glass or plastic on which, as shown in FIGS. 4 and 5, various message symbols are arranged. For purposes of illustration the message symbols shown on the symbol mask in FIGS. 4 and 5 are shown positive, whereas in a practical device in accordance with this invention the symbols are formed in negative on an opaque, usually black background and appear inverted. In the embodiment illustrated, four different message symbols are provided for each projection system spaced from one another in a vertical line so that any one can be aligned in its associated projection path to be imaged on the viewing screen 12. In FIG. 4 the dashed circle 32 illustrates the intersection of one projection path with the symbol mask 14. In this case, light from the associated lamp 16 is condensed by the condensing lens 18 to fall on the area including the third message symbol of the group of four, in this case the message symbol being the numeral "3."

In the particular embodiment illustrated herein, there are a total of twelve different projection systems, and four different message symbols for each projection system, providing a total selection of forty-eight different message symbols that can be displayed on the viewing screen 12. In FIG. 5, the symbol mask 14 is shown with a typical arrangement wherein the forty-eight message symbols consisting of letters, numerals and punctuation marks are arranged in twelve groups of four symbols each. The symbols in the corresponding vertical positions in the groups of four make a complete symbol set of twelve, with each symbol in the set being arranged for alignment in a different optical path. In accordance with this embodiment, the upper symbols in each group are aligned with different optical paths when the bottom edge of the reticle 14 is held in the normal position against the upper surface of the base member 40 toward which it is urged by downward spring force of the solenoid 68.

As best seen in the schematic illustration of FIG. 4 with four message symbols per optical path, three different solenoids 44 are each connected to operate a respective shuttle or spacer element 62. The shuttle or spacer elements 62 each have a portion 84, 86 and 88 of a different desired thickness corresponding to the vertical spacing between the different symbols in each group on the symbol mask 14. The shuttle portion 84 has a thickness equal to the distance between the first and second symbols in the groups, the shuttle portion 86 a thickness equal to the distance between the first and fourth message symbols, and the shuttle portion 88 a thickness equal to the distance between the first and third symbols. Thus, by inserting a selected one of the shuttle portions 84, 86 or 88 between the lower edge of the symbol mask and the top surface of the base member 40, the symbol mask will be accurately positioned to dispose a selected set of symbols in the different projection paths. Alternatively, the bottom edge of the symbol mask, or a contact member attached for movement with the symbol mask, may be formed in step fashion with the shuttles all having the same thickness, or if desired even different thicknesses, so long as the symbol mask is properly positioned when downward movement is arrested, by contact with the inserted shuttle.

In operation, assuming that the symbol mash 14 is originally in its normal downward position with its lower edge abutting the upper surface of the base member, the symbol mask 14 is moved to a different position, such as that shown in FIG. 4, by simultaneously applying a short actuating pulse both to the symbol mask solenoid 68 and a selected one of the shuttle solenoids 44. Actuation of the symbol mask solenoid 68 lifts a reticle 14 upwards against the force of the solenoid spring 72 to an extreme upper position, as shown by dashed lines 90, to permit the end of any of the shuttle elements 62 to be inserted underneath. At the same time, the selected solenoid shuttle 44 is energized to move the plunger 56 against the force of the spring 50 in the direction of the symbol mask 14. The plunger 56 travels a short distance until it engages the upward extension 58 on the shuttle 62, after which the continued travel of the plunger 56 slides the selected shuttle or spacer element 62 over the top surface of the base member 40 to a position where the shuttle section 88 is beneath the lower edge of the uplifted symbol mask 14 in its plane of movement. When the energizing pulse applied to the solenoids 68 and 44 ceases, the force of the spring 72 returns the symbol mask 14 towards its normal position. However, as the force of the spring 50 on the shuttle solenoid 44 begins movement of the plunger member 56 back toward its original position, the shuttle 62 does not move until the plunger member 56 moves away from the extension 58 towards contact with the other extension 60. By this time, the lower edge of the symbol mask 14 has descended sufficiently to be in contact with the upper surface of the shuttle section 88 where its downward movement is stopped. Each of the shuttle or spacer elements 62 is provided with an upwardly extending lip or detent 92 at its tip of the spacer portion which engages the symbol mask 14 to prevent further withdrawal. Thus, the shuttle 62 is held in that position against the force of the spring 72 with the portion 88 between the lower edge of the symbol mask 14 and the base member 40. Since the thickness of the portion 88 is equal to the space between the first and third symbols in each four symbol group, the third symbol in each group is positioned in the respective optical paths. Upon the occurrence of the next actuating pluse, the symbol mask 14 is again lifted to its upper position 90, which disengages its lower edge from the lip 92 to allow the shuttle 62 to be fully withdrawn back to its original position out of the plane of symbol mask movement, and another shuttle to be inserted. If none of the shuttle solenoids 44 are actuated, then the spring 72 returns the symbol mask 14 to its normal position with its lower edge abutting the upper surface of the base member 40, thus disposing a set of symbols which contains the first symbol in each group in the various optical paths. The movement of the plunger 56 between the vertical extensions 58 and 60 on each of the shuttle or spacer elements 62 thus serves as a mechanically delay device which permits the symbol mask solenoid 68 and the selected shuttle solenoid 44 to be actuated simultaneously during the same pulse interval. This permits the lower edge of the symbol mask 14 to be moved free of the path of movement of the shuttle or spacer elements 62 before their forward edge reaches the plane of symbol mask movement, and the symbol mask to be lowered to engage the lip 92 before the tip of the shuttle or spacer elements 62 are withdrawn.

The arrangement illustrated and described herein in accordance with this invention considerably simplifies circuitry and power requirements. The accompanying schematic circuit diagram illustrated in FIG. 4 may, for example, be used to achieve the desired operation of the readout device. Typically, the particular message symbol to be displayed on the viewing screen 12 is indicated by a binary information signal, in this case including six binary bits that are applied to a symbol selection circuit 94, which may be a diode matrix or other suitable decoding circuit. Usually, the binary coding of the input signal is selected so that two of the bits are used to designate the particular set of message symbols which contains the symbol to be displayed, and thus the desired position of the symbol mask 14. The four remaining binary bits indicate the particular one of the twelve symbol groups containing the message symbol to be displayed, and thus determine which of the twelve lamps 16 is to be energized. The symbol selection circuit 94 produces an output signal for actuating a one shot pulse source 96 each time the symbol designation represented by the binary input signal changes, or if desired only when a change occurs in the binary value of the two bits used to designate the symbol set containing the desired message symbol. Thereupon, the pulse source 96 generates a solenoid actuating pulse to be applied to the symbol mask solenoid 68 and to the input of three pulse gates 98, each of which has its output connected to the coil of a respective one of the shuttle solenoids 44. If the selected symbol is contained in any but the first set containing the top symbol in each group, then a gating signal is applied by the symbol selection circuit 94 to the appropriate gate 98 to open it, permitting the actuating pulse from the source 96 to actuate the appropriate shuttle solenoid 44. Also, an operating voltage is supplied to the appropriate lamp 16, which is used to project the selected message symbol onto the viewing screen 12. Preferably, all electrical connections to the lamps and solenoids are made through the different conductive segments on the external connector 32. Although a particular circuit arrangement has been shown herein by way of illustration, it should be understood that the symbol selection may be accomplished by various means including use of symbol selection switches.

The message display unit in accordance with this invention thus permits the selective display on a viewing screen of a number of different message symbols greatly exceeding the number of optical paths. Moreover, the exact positioning of the symbol mask is achieved by the application of single solenoid energizing pulse of short duration, instead of maintaining the solenoids continuously energized. It will be recognized by those skilled in the art that movement of the symbol mask 14 as shown herein in the vertical direction, while usually preferable is not necessary to achieve exact symbol mask positioning in accordance with the principles of the invention. In other instances, the movement of the symbol mask may be in any direction toward and away from an appropriately located base member or stop, with the spacer elements being inserted between the base member or stop and the symbol mask to achieve proper positioning. Movement of the symbol mask might even be circular if desired with a different set of symbols being spaced at exact angles from one another and solenoid operated shuttles being used to define precise angular displacements of the symbol mask away from a normal position.

What is claimed is:

1. A visual display device comprising:

a viewing screen;

a plurality of individually operable projection systems for selectively projecting images along different optical paths onto said viewing screen;

a symbol mask having message symbols disposed thereon to be positioned in the projection paths for projection as images by different ones of said projection systems onto said viewing screen, said symbol mask containing a given number of different message symbols for each projection path spaced from one another along an axis parallel to the direction of movement of the symbol mask;

means responsive to an actuating pulse for moving said symbol mask in said direction of movement away from a normal position and for urging said symbol mask toward said normal position upon cessation of the actuating pulse; and spacer means responsive to said actuating pulse for being selectively moved to an inserted position when said symbol mask is moved away from its normal position to arrest the movement of said symbol mask toward said normal position at a given distance from said normal position corresponding to the spacing between different ones of said given number of message symbols to dispose a selected one of said number of message symbols in each projection path, said spacer means including means for normally urging said spacer means away from said inserted position and means for contacting said symbol mask when arrested to maintain said spacer means in said inserted position after cessation of said actuating pulse.

2. The visual display device of claim 1 further comprising: a base member, said symbol mask having an edge in contact with said base member when in said normal position, said spacer means being inserted between the edge of said symbol mask and the base member, said spacer means having a thickness corresponding to the spacing between different ones of said given number of message symbols.

3. The visual display device of claim 2 wherein:

said spacer means further comprises separate shuttle means slidably movable on said base member and associated solenoid means responsive to said actuating pulse for slidably moving said shuttle means into the path of movement of said symbol mask between the edge of said symbol mask and said base member;

said means for normally urging said spacer means consisting of a spring loading means on said solenoid;

and said means for contacting said symbol mask consisting of detent means on said shuttle means for engaging the edge of said symbol mask to hold the shuttle means against the urging of said spring loading means.

4. The visual display device of claim 3 further comprising: mechanical delay means coupling said solenoid to said shuttle member; and means for applying actuating pulses simultaneously to a selected one of said solenoid means and said symbol mask moving means.

5. A visual indicating device comprising:

a visual display device comprising a plurality of individually operable projection systems for projecting images along different optical paths toward a common viewing area;

a movable symbol mask having message symbols disposed thereon to be positioned in the projection paths for projection as images by different ones of said projection systems, said symbol masks containing a given number of different message symbols for each projection system spaced from one another along the path of movement of the symbol mask;

means for urging the movable symbol mask to a normal position along the path of movement;

means for temporarily displacing the movable symbol mask from the normal position;

a plurality of spacer elements each being selectively insertable into the path of movement of the symbol mask during displacement from the normal position to maintain the movable symbol mask at a different selected distance from the normal position when said symbol mask is being urged toward the normal position after displacement; and means responsive to control signals for moving a selected one of the spacer elements into the path of movement of said symbol mask during the temporary displacement, said spacer element containing means for engaging said symbol mask to maintain said spacer element within the path of movement until the next temporary displacement.

6. The visual display device of claim 5 further including: pulse means for simultaneously energizing and deenergizing the displacing means and the selected one of the plurality of means for moving the spacer elements.

7. The visual display device of claim 6 further comprising:

a base member disposed in the path of movement of said symbol mask for limiting the movement of said symbol mask to assume said normal position;

and wherein said spacer elements are movable along said base member in a direction substantially normal to the path of movement of the symbol mask, each having a different thickness along the path of symbol mask movement, said thickness corresponding to the spacing between said given number of message symbols.

8. In a visual indicating device having a plurality of optical systems for projecting images of message symbols formed on a symbol mask in different optical paths, a symbol mask shifting arrangement for selecting one of a given number of different message symbols for each optical path comprising:

a symbol mask movable in a path in a direction normal to the optical paths;

a plurality of shuttle elements each selectively movable into and out of the path of movement of the symbol mask having a spacing portion with a thickness along the direction of symbol mask movement corresponding to the spacing between said given number of message symbols for each optical path; and means for selectively positioning the spacing portion of a selected one of the shuttle elements in the path of symbol mask movement for arresting the movement of the symbol mask along said path in selected positions with selected different ones of said given number of message symbols disposed in said optical paths.

9. The symbol mask shifting arrangement of claim 8 further comprising:

means for normally urging each shuttle, element out of the path of symbol mask movement;

means responsive to an actuating pulse for moving a selected one of the shuttle elements into the path of symbol mask movement;

means for normally urging the symbol mask toward a normal position and responsive to an energizing pulse for temporarily moving the symbol mask away from said normal position to permit insertion of the selected shuttle element, whereby the thickness of the spacing portion of the selected shuttle element maintains said symbol mask displaced from said normal position a distance equal to the spacings between said given number of message symbols on said symbol mask.

10. The symbol mask shifting arrangement of claim 9 further comprising:

mechanical delay means coupling said shuttle element moving means to said shuttle element for temporarily delaying movement of the shuttle element into the path of symbol mask movement until said symbol mask is displaced from said normal position; and means for energizing said shuttle element moving means and said symbol mask moving means simultaneously.

11. The symbol mask shifting arrangement of claim 10 wherein:

each of said shuttle elements includes an extending portion adapted to engage an adjacent portion of the symbol mask for holding the selected shuttle element in the path of symbol mask movement to prevent withdrawal prior to the next displacement of the symbol mask.

References Cited

UNITED STATES PATENTS

| | | | |
|---|---|---|---|
| 2,163,188 | 6/1939 | Bosche | 340—378 X |
| 3,153,227 | 10/1964 | Wales | 340—324 |

OTHER REFERENCES

Webster's New International Dictionary of the English Language, 2nd edition, unabridged, G. & C. Merriam Co., 1957, p. 2127.

THOMAS B. HABECKER, Primary Examiner

CHARLES M. MARMELSTEIN, Assistant Examiner

U.S. Cl. X.R.

340—324, 347